May 1, 1928. 1,668,449

A. H. BRACKENSEY

SIGN

Filed Nov. 28, 1927 2 Sheets-Sheet 1

INVENTOR
A.H.Brackensey
per.
V.R.Bowden
Attorney.

May 1, 1928.                                                    1,668,449
A. H. BRACKENSEY
SIGN
Filed Nov. 28, 1927          2 Sheets-Sheet 2

INVENTOR
A. H. Brackensey.
per.
R W Bowden
Attorney.

Patented May 1, 1928.

1,668,449

UNITED STATES PATENT OFFICE.

AUGUSTE HARRY BRACKENSEY, OF LONDON, ENGLAND.

SIGN.

Application filed November 28, 1927, Serial No. 236,320, and in Great Britain August 13, 1926.

This invention relates to light reflecting devices, signs, signals and the like which comprise a transparent foundation plate furnished with a plurality of lenses or lens-like bodies, the rear surfaces of which are backed with reflectors.

Objects of this invention are to reduce the cost and improve the construction and arrangement of such multiple lens reflecting devices, signs, signals and the like so as to increase the optical efficiency thereof through a wide angle of aspect, and thus render the same more generally useful.

According to this invention reflecting devices, signs, signals and the like of the kind referred to comprise one or more glass foundation plates each formed or furnished with a plurality of plano-convex lenses or lens-like bodies, the axial length of each of which lenses of lens-like bodies is greater than the radius of the convex face thereof, the plain faces of such lenses or lens-like bodies being comprised in the opposite surface of the plate, which surface is silvered or backed with a reflecting device or devices arranged in optical register with the lenses or lens-like bodies.

The glass foundation plate carrying the lenses or lens-like bodies may be of simple or compound construction. For example, the foundation plate having lenses or lens-like bodies on one face may be backed with silvered glass or with plain glass behind which a reflecting device or devices is or are suitably arranged, or two glass foundation plates each provided with convex lenses or lens-like bodies on one face may be assembled back to back, a suitable double-faced mirror or reflector or reflectors being arranged between the glass foundation plates so as to form a double face reflecting sign.

Alternatively, the two glass foundation plates, each provided with convex lenses on one face thereof, may be assembled back to back with their respective convex lenses in optical register so as to form a plurality of bi-convex lenses the axial lengths of which are greater than the radii of their convex faces; a suitable reflector or reflectors being arranged behind one face of the compound glass foundation plates so formed.

In one convenient construction lenses of any required cross-section may be cast or moulded integrally with the glass plate, the lenses being of any suitable axial length so as to project from the front surface of the glass plate and terminate in convex faces, the plain faces of the lenses being comprised in the rear face of the glass plate, which latter may be silvered or be covered with a sheet of copper or other suitable reflecting material pressed to form concave reflectors, while the axial length of the lenses may be approximately twice the radius of their convex surfaces.

The copper or other sheet is cemented or otherwise secured to the rear surface of the glass plate so that its concave reflecting surfaces register with the lenses of the glass plate.

Letters or other devices may be readily delineated by covering the front or lens face of the glass plate with bitumin, cement or the like in order to cover all the lenses not required for display.

Alternately, the lens face of the glass plate may be covered with a stencilled shield or the like so as to expose only the lenses required for the display, the remainder being concealed by the shield.

Instead of casting the lenses integrally with a glass foundation plate, the lenses may be cemented to the front surface thereof and be arranged symmetrically or so as to form any device required, the rest of the glass plate being covered with cement or by a shield plate or plates or the like, either flush with the front surfaces of the lenses or otherwise as preferred, while the reflecting device or devices is or are arranged upon the rear face of the glass foundation plate.

The glass foundation plate carrying the lenses or lens-like bodies may be either flat or curved, and is conveniently constructed in sections of any required shape or shapes which can be readily assembled in a frame or like support to form a letter or other sign that may be surmounted with a border of lenses, facets or the like, the same being illuminated by the reflection of natural or artificial light incident thereon.

To obtain colour effects the rear surfaces of the lenses, or the rear surface of the glass foundation plate, may be coated with transparent coloured varnishes or be flashed with coloured glass or the like, or the colouring media may be arranged upon the reflecting devices. Alternatively, the lenses may be made in tinted glass.

The glass foundation plate may be thin relatively to the axial length of the lenses or lens-like bodies either formed therewith or mounted thereon, or the glass plate may be relatively thick so as to form the main body of the lenses, the convex faces of which project beyond the front surface of the plate.

The invention is diagrammatically illustrated by way of example in the accompanying drawings, wherein:—

Figure 1 is a fragmental face view, and Figure 2 a cross-section on the line II—II (Figure 1), of a glass foundation plate with which a plurality of lenses are formed integrally so as to project from one face only of the plate, while

Figure 1:
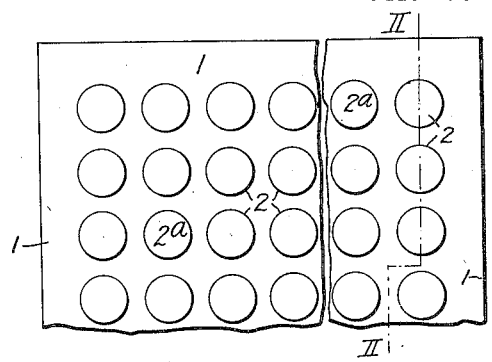
Figure 2:
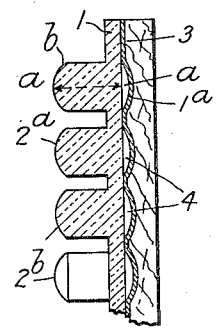

Referring to Figures 1 and 2:—

The glass foundation plate 1 is in the form of a rectangular panel, with which a plurality of plano-convex lenses 2 are integrally formed so as to project from one face thereof.

As illustrated at Figure 2, the glass foundation plate 1 is thin relatively to the axial length $a$—$a$ of the plano-convex lenses formed integrally therewith, while the convex faces $2^a$ of the lenses 2 are formed to a curvature that is approximately half the axial length $a$—$a$ of the lenses, the plain faces of which latter are comprised in the rear surface $1^a$ of the glass foundation plate 1, behind which a reflecting device 3 is arranged.

As shown, the reflecting device 3 comprises a sheet of silvered copper or other suitable reflecting material which is pressed to form a plurality of concave reflecting surfaces 4, such copper sheet being mounted behind the plain face $1^a$ of the glass foundation plate 1 so that the concave reflecting surfaces 4 come into optical register with the lenses 2.

Alternatively, the reflecting device 3 may comprise a plurality of copper or other strips which are assembled to the back of the foundation plate 1 so that the concave reflecting surfaces 4 are in optical register with their corresponding lenses.

Figure 3:
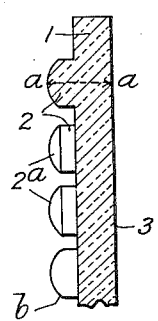
Figure 3 is a cross-section illustrating a modification in which the foundation plate is thick relatively to the lenses formed therewith.

A modified construction is illustrated at Figure 3, wherein the glass foundation plate 1 is made thick relatively to the axial length $a$—$a$ of the plano-convex lenses formed integrally therewith, the reflecting device 3 being formed by silvering the plain face $1^a$ of the glass foundation plate 1.

Figure 4:
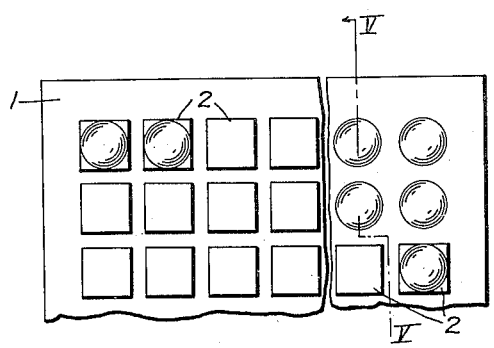
Figure 4 is a fragmental face view, and Figure 5 a cross-section on the line V—V (Figure 4), showing one construction of a compound glass foundation plate, on one surface of which a plurality of convex lenses are formed integrally, the opposite face being backed with a piece of plain glass carrying reflectors.
Figure 5:
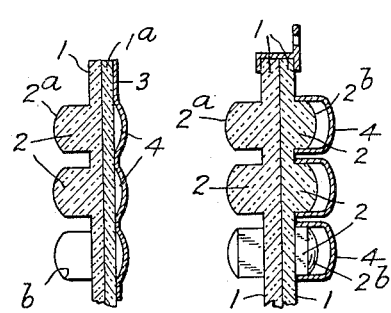
Figure 6:
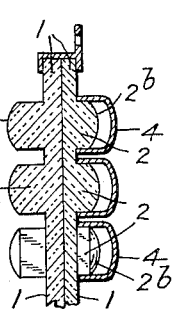
Figure 6 is a cross-section showing a further construction of compound foundation plate comprising two glass plates each provided on one face with a plurality of convex lenses, the plates being arranged with their smooth surfaces in juxtaposition so as to form a glass foundation plate having a plurality of bi-convex lenses.

Figures 4 to 6 illustrate constructions of a compound glass foundation plate. A plurality of plano-convex lenses 2 are formed integrally with a relatively thin glass foundation plate 1, the plain face $1^a$ of which is backed with a piece of plain glass 5, behind which latter is mounted a copper sheet or strips of copper 3 formed with concave reflecting surfaces 4 so that such reflecting surfaces are in optical register with the lenses on the glass foundation plate 1. Alternatively, the plain glass 5 may be silvered to form a reflector.

Figure 6 illustrates a compound foundation plate formed by assembling two glass plates 1, each provided on one surface with plano-convex lenses 2, which plates are assembled back to back with their respective lenses in optical register so as to form a glass foundation plate having a plurality of compound bi-convex lenses the axial lengths $a$—$a$ of which are greater than the radii of the convex faces $2^a$, $2^b$, the faces $2^b$ being backed with concave reflecting caps 4 the curvature of which is greater than the curvature of the lense surfaces $2^a$.

Instead of separate reflecting caps, the faces $2^b$ of the bi-convex lenses so formed may be backed with a copper sheet or strips formed with concave reflecting surfaces as previously described.

The front convex surfaces $2^a$ of the lenses 2 may be formed with rounded edges, as indicated at $b$ (Figures 2 and 5), or the curved front surfaces may spring sharply from the sides of the lens bodies in the ordinary manner, as indicated at the same figures.

The bodies of the lenses projecting beyond the glass foundation plate may be of rectangular cross-section as illustrated on the left hand side of Figure 4, or of circular cross-section as indicated at Figure 1 and on the right hand side of Figure 4.

Where separate reflecting sheets, strips or caps are employed, the concave reflecting surfaces 4 may be of any required curvature but are spaced away from the adjacent lens surface. Thus, as illustrated in Figure 1, the radius of curvature of the reflecting surfaces 4 is about equal to the axial length $a$—$a$ of the lenses 2, while in Figure 6 the curvature of the reflecting surfaces 4 is less than that of the rear convex surfaces $2^b$ of the lenses.

The glass foundation plate 1 carrying the lenses or lens-like bodies 2 is conveniently constructed in sections which may be either flat or curved in cross-section, and may be of various shapes so that the same can be readily assembled in or on a frame or other support to form the required letter, sign or device.

Figure 7:
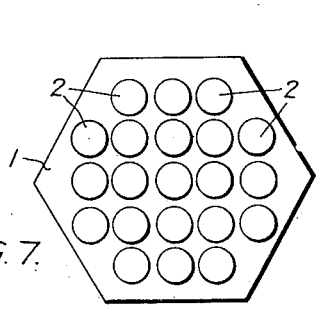
Figures 7, 8 and 9 are face views, and Figure 10 a transverse section, illustrating the glass foundation plate carrying the lenses or lens-like bodies formed in sections of various shapes adapted to be assembled in or on a frame or like support to form a sign.
Figure 8:
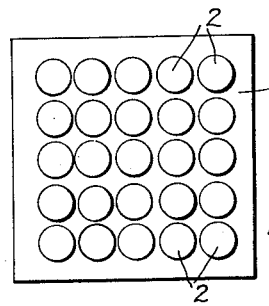
Figure 9:
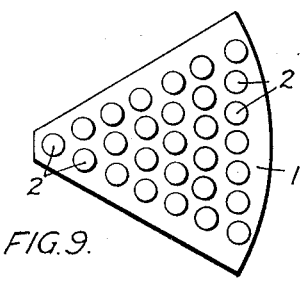
Figure 13:
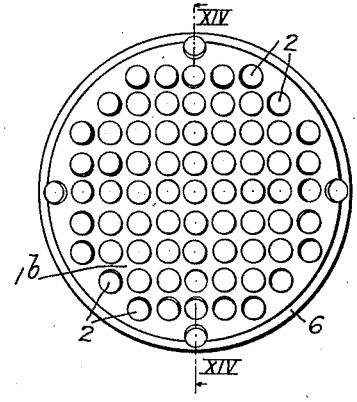
Figure 13 is a face view, and Figure 14 a cross-section illustrating one construction of curved foundation plate provided with a plurality of plano-convex lenses or lens-like bodies in accordance with the present invention.

These sections may be in the form of hexagons, rectangles and wedges, as illustrated at Figures 7, 8 and 9, or the same may be circular as indicated at Figure 13, or be of any required shape so that the sections can be readily assembled in or on a frame or other support to form a letter, device or other sign.

Figure 10:
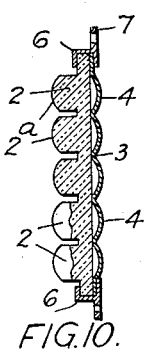

Each section may be backed with a suitable reflecting device as 3, which may also be adapted as a means for securing the sections to a suitable support. Thus, as illustrated at Figure 10, each section is backed with a metal reflecting sheet or with strips having concave reflecting surfaces 4, the edges 6 of the metal sheet or strips being turned over the edges of the glass foundation plate 1 to form a weatherproof joint, while perforated lugs 7 are secured on the metal sheet to form purchases for screws, nails or other fastenings by which the sections can be readily secured in a suitable frame or other support.

Figure 14:
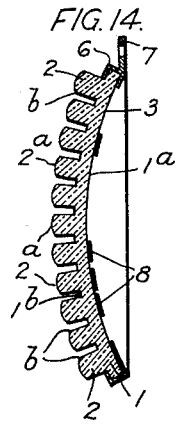

The glass foundation plate 1 may be curved in cross-section as illustrated for example in Figure 14, which is a cross-section on the line XIV—XIV (Figure 13). As shown, the glass foundation plate is circular and curved or dished outwards, the lenses or lens-like bodies 2 being of plano-convex form, the axes $b$ thereof being normal to the convex front surface $1^b$ of the glass foundation plate.

The concave rear surface $1^a$ of the curved glass foundation plate 1 may be formed with a series of reflecting flats 8 which correspond with the convex lenses on the opposite convex face of the foundation plate and form the plain faces.

The curved glass foundation plate may be silvered, as indicated at Figure 14, or be backed with a sheet or strips of copper provided with concave reflecting surfaces 4 arranged in optical register with the lenses or lens-like bodies 2, the edges 6 of the reflecting metal sheet or strips being beaded over the edges of the glass foundation plate 1 to form a weatherproof joint, perforated lugs 7 being secured to the metal sheet to form purchases for screws, nails or other fastenings by which the sections can be readily secured in or on a suitable support.

If desired the curved foundation plate may comprise a compound structure, as described with reference to Figures 4 to 6. That is to say, one curved foundation plate carrying a plurality of lenses or lens-like bodies on its concave surface may be assembled to a correspondingly curved glass foundation plate carrying lenses on its concave surfaces, the lenses of the respective plates being so arranged as to come into optical register when the curved foundation plates are assembled together, the concave surface of the compound glass foundation plate so formed being silvered or backed with a suitable reflecting device, such for example as a sheet of copper or metal strips formed with concave reflecting surfaces, the edges of which may be beaded over the edges of the compound glass foundation plate so as to clamp the elements together; means, such as perforated lugs, being provided for securing the entire section in place, as described with reference to Figures 13 and 14.

Figure 11:
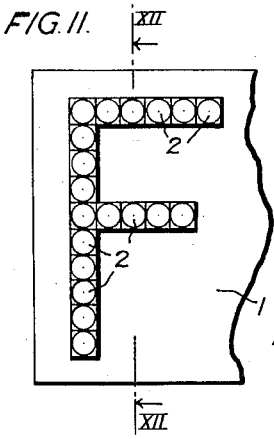
Figure 11 is a fragmental face view, and Figure 12 a cross-section on the line XII—XII (Figure 11), illustrating one construction in which a plurality of plano-convex lenses are cemented to one face of the foundation plate behind the opposite face of which reflectors are arranged.
Figure 12:
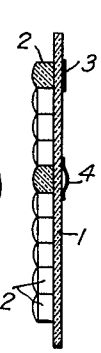

Reflecting signs can be readily formed with glass foundation plates carrying a plurality of lenses and backed with reflecting devices in accordance with the present invention. Thus, as illustrated at Figures 11 and 12, a plurality of plano-convex lenses 2 are secured with translucent cement to the front surface of the glass foundation plate 1, and are arranged symmetrically so as to form the device required, the rest of the front surface of the plate 1 being painted or otherwise covered so as to display the symmetrically arranged lenses thereon.

The rear surface of the foundation plate 1 may be silvered, as indicated at 3 (Figure 12) so as to form a reflecting surface for the lenses 2, or be furnished with concave reflecting strips or caps arranged symmetrically with the lenses 2, as indicated.

Figure 15:
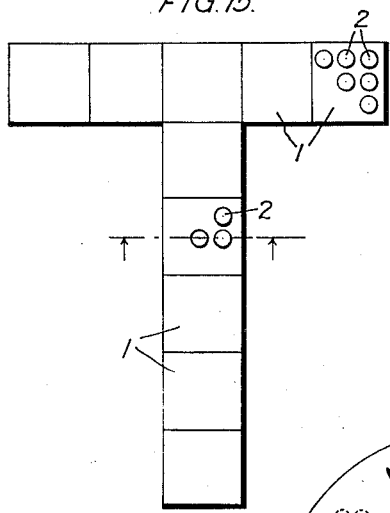
Figures 15 and 16 are respectively face and transverse sectional views illustrating one construction of reflecting signs in accordance with the present invention.
Figure 16:
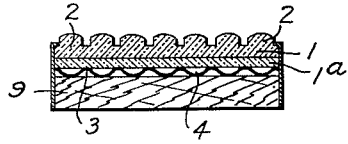

As illustrated at Figs. 15 and 16, the glass foundation plate 1, provided with integral convex lenses or lens-like bodies 2, is formed in rectangular sections which are secured upon a wooden or other suitable backing 9. As shown, a compound glass foundation plate is employed, each section comprising a glass plate 1 provided on one surface with plano-convex lenses 2 and backed with a plain glass plate 5 which plates are assembled as described with reference to Figure 5 so as to form a compound foundation plate having a plurality of convex lenses which are backed with a sheet of copper or the like 3 wherein concave reflecting surfaces 4 are formed, each complete section of the glass foundation plate, with its reflecting device, being secured to the backing 9 in any convenient manner.

Figure 17:
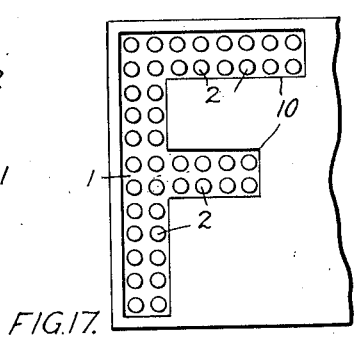
Figures 17 and 18 are respectively fragmental face and transverse sectional views illustrating a modified construction of sign in accordance with the present invention.
Figure 18:
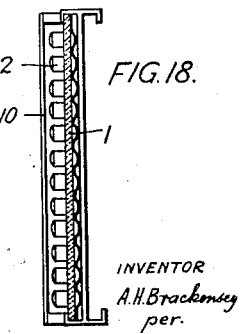

Figures 17 and 18 illustrate another construction of sign in which the glass foundation plate 1 carrying a plurality of lenses or lens-like bodies 2 is made in sections of any required form and assembled in or on a backing or frame 9, the display face of the glass foundation plate being covered with stencilled plates 10 so as to expose only the lenses 2 required to form the sign or display, the remaining lenses being concealed by the unbroken parts of the stencilled plates 10.

The stencilled plates may be made of metal or other material, and be clamped or otherwise secured on the face of the sign.

Figure 19:
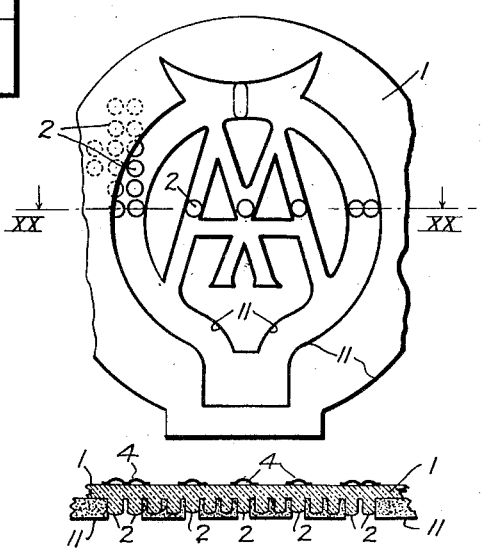
Figures 19 and 20 are respectively front and sectional views showing a further construction of reflecting signs in accordance with the present invention.
Figure 20:

Figures 19 and 20 illustrate a further construction of sign in which the glass foundation plate 1, provided with a plurality of lenses or lens-like bodies 2 on one face, is in the form of a panel on which the sign to be displayed is delineated by covering the lenses not required to be displayed with bitumen, cement or the like 11, the displayed lenses being backed with copper or other strips 3 formed with concave reflecting surfaces 4. The sign so formed may be mounted in a frame, or be secured to a backboard or other support in any preferred manner.

I claim:—

1. A light reflecting device, sign, signal and the like comprising a transparent foundation plate having a plurality of plano-convex lenses, the axial length of each of which is greater than the radius of the convex face thereof, said convex faces projecting from one face of the transparent foundation plate, while the plain faces of the lenses are comprised in the opposite plain surface of the foundation plate, and a reflecting surface arranged as a backing for the plain surface of the foundation plate.

2. A light reflecting device, sign, signal and the like comprising a transparent foundation plate having a plurality of plano-convex lenses formed integrally with one surface of said foundation plate so that the convex faces of the lenses project from the one face of said foundation plate, while the plain faces of said lenses are comprised in the opposite plain face of said foundation plate, the axial length of each of which lenses is greater than the radius of the convex face thereof, and a reflective backing for said plain face of the glass foundation plate.

3. A light reflecting device, sign, signal and the like comprising a transparent foundation plate having a plurality of lenses attached to one surface thereof so that said attached lenses form in combination with the glass foundation plate a plurality of compound plano-convex lenses the plain face of each of which is comprised in the opposite plain surface of the glass foundation plate, while the axial length of each of the compound plano-convex lenses is greater than the radius of its convex face, and a reflecting surface arranged at the back of the plain surface of said glass foundation plate.

4. A light reflecting device, sign, signal and the like comprising a transparent foundation plate having a plurality of plano-convex lenses on one face thereof, the opposite face of said foundation plate being plain, said plain face being backed with plain glass so as to form in combination with the lens-carrying foundation plate a series of compound plano-convex lenses, the axial length of each of which is greater than the radius of its convex face, while the plain face of each lens is comprised in the remote plain face of the glass backing of the foundation plate, and a reflecting surface behind said remote face of said glass backing.

5. A light reflecting device, sign, signal and the like comprising two transparent foundation plates each carrying a plurality of plano-convex lenses the axial length of each of which is greater than the radius of the convex face thereof, while the plain face of each lens is comprised in the plain surface of its foundation plate, said two foundation plates being assembled back to back.

6. A light reflecting device, sign, signal and the like comprising two transparent foundation plates each carrying similar series of plano-convex lenses, the axial length of each of which is greater than the radius of the convex face thereof, while the plain face of each lens is comprised in the plain surface of its foundation plate, said two foundation plates being assembled back to back with their respective series of plano-convex lenses in register to form a compound foundation plate having a plurality of bi-convex lenses behind one face of which compound foundation plate are mounted concave reflecting devices arranged in optical register with the compound lenses.

7. A light reflecting device, sign, signal and the like comprising a transparent foundation plate having a plurality of plano-convex lenses, the axial length of each of which is greater than the radius of the convex face thereof, said convex faces projecting from one face of the transparent foundation plate, while the plain face of each lens is comprised in the plain surface of the foundation plate, and a backing for the plain face of said foundation plate comprising a sheet of metal formed with a plurality of concave reflecting surfaces which are adapted to optically register with the lenses of the glass foundation plate.

8. A light reflecting device, sign, signal and the like comprising a transparent foundation plate having a plurality of planoconvex lenses, the axial length of each of which is greater than the radius of the convex face thereof, said convex faces projecting from one face of the transparent foundation plate, while the plain faces of the lenses are comprised in the opposite plain surface of the foundation plate, and a reflecting surface arranged as a backing for the plain surface of the foundation plate; said reflecting device, sign, signal and the like being constructed in independent sections which are adapted to be assembled to a frame or support.

9. A light reflecting device, sign, signal and the like comprising a transparent foundation plate having a plurality of planoconvex lenses, the axial length of each of which is greater than the radius of the convex face thereof, said convex face projecting from one face of the transparent foundation plate, while the plain faces of the lenses are comprised in the opposite plain surface of the foundation plate, and a reflecting surface arranged as a backing for the plain surface of the foundation plate, in combination with a stencilled shield so as to cover the lens face of said reflecting device and delineate the display to be effected.

10. A light reflecting device, sign, signal and the like comprising a transparent foundation plate having a plurality of planoconvex lenses, the axial length of each of which is greater than the radius of the convex face thereof, said convex face projecting from one face of the transparent foundation plate, while the plain faces of the lenses are comprised in the opposite plain surface of the foundation plate, and a reflecting surface arranged as a backing for the plain surface of the foundation plate, wherein the lens face of said foundation plate is covered with cement so as to delineate the display or signal required.

11. A light reflecting device, sign, signal and the like comprising a transparent foundation plate having a plurality of planoconvex lenses, the axial length of each of which is greater than the radius of the convex face thereof, said convex face projecting from one face of the transparent foundation plate, while the plain faces of the lenses are comprised in the opposite plain surface of the foundation plate, a reflecting surface arranged as a backing for the plain surface of the foundation plate, and a transparent colour screen arranged between the rear surface of the foundation plate and said reflector to produce colour effects.

In testimony whereof I affix my signature.

AUGUSTE HARRY BRACKENSEY.